(12) United States Patent
Shuster

(10) Patent No.: US 7,916,619 B2
(45) Date of Patent: Mar. 29, 2011

(54) OPTICALLY-READABLE DISK WITH COPY PROTECTION DEVICE

(76) Inventor: Gary Stephen Shuster, Fresno, CA (US)

( * ) Notice: Subject to any disclaimer, the term of this patent is extended or adjusted under 35 U.S.C. 154(b) by 769 days.

(21) Appl. No.: 11/744,123

(22) Filed: May 3, 2007

(65) Prior Publication Data
US 2008/0273451 A1 Nov. 6, 2008

(51) Int. Cl.
*G11B 3/70* (2006.01)
(52) U.S. Cl. ............... 369/284; 369/275.5; 369/30.05; 369/30.19; 369/47.12; 720/719
(58) Field of Classification Search .................. None
See application file for complete search history.

(56) References Cited

U.S. PATENT DOCUMENTS

| | | |
|---|---|---|
| 5,787,068 A | 7/1998 | Arps et al. |
| 5,832,088 A | 11/1998 | Nakajima et al. |
| 6,266,299 B1 | 7/2001 | Oshima et al. |
| 6,597,648 B1 | 7/2003 | Yeo et al. |
| 7,039,927 B2 * | 5/2006 | Constantinou et al. ....... 720/718 |
| 2001/0046204 A1 * | 11/2001 | Rollhaus et al. ............. 369/284 |
| 2003/0149885 A1 | 8/2003 | Fang et al. |
| 2003/0179663 A1 | 9/2003 | Tomita |
| 2003/0185128 A1 | 10/2003 | Shoji et al. |
| 2005/0169145 A1 | 8/2005 | Yumiba et al. |
| 2006/0268661 A1 * | 11/2006 | Ferren et al. .................. 367/13 |

FOREIGN PATENT DOCUMENTS

JP     8-55342    2/1996

* cited by examiner

*Primary Examiner* — Joseph H Feild
*Assistant Examiner* — Ifedayo Iluyomade
(74) *Attorney, Agent, or Firm* — Connolly Bove Lodge & Hutz LLP; Jonathan A. Jaech

(57) ABSTRACT

An optically-readable disk includes a device that disrupts readability of the disk when the disk is spun at an angular velocity substantially greater than required to play the disk in its intended playing device, or for when a defined integral of velocity and time is exceeded. The device may include a fluid container that disperses a data-disruptive fluid. The device may include a membrane or layer that is disrupted when the disk is rotated above a defined angular velocity, or when a defined integral of velocity and time is exceeded.

6 Claims, 3 Drawing Sheets

OPTICALLY-READABLE DISK WITH COPY PROTECTION DEVICE

BACKGROUND OF THE INVENTION

1. Field of the Invention

The present invention relates to an optically readable disk designed to inhibit the copying of the content recorded on it by being rendered unreadable when read at any speed higher than the disk's standard playback speed.

2. Background of the Invention

Optically-read disks present a common and popular way of storing data and other content. Specifically, consumer entertainment content in the form of movies, music and other media are commonly recorded on disks and sold to consumers. Optically-read disks include, for example, audio CDs, CD-ROMs, and DVDs.

Unfortunately, the content recorded on optically-read disks can be illegally reproduced in violation of copyright laws. Such unauthorized reproduction is especially widespread due to the increasing availability and affordability of equipment used to reproduce the content recorded on an optically-read disk.

There have been various attempts to inhibit such copying, the majority of which focus on various encryption methods designed to prevent copying. In addition, some optical disks may be protected by means of noncontiguous data files separated by barriers designed to interrupt a disk player's reading of the disk.

Previous security devices and techniques aimed at preventing the illegal copying of protected content recorded on optically-readable disks, besides being expensive to implement, have focused on methods to overcome, and stay one step ahead of, disk player and disk recording technology. Unfortunately, as the security features implemented to prevent illegal copying becomes more sophisticated, they are quickly rendered obsolete due to the continuing and rapid advancement of disk recording technology. Accordingly, there is a need for an optical disk having a copy protection feature which overcomes the aforementioned deficiencies of the prior art.

SUMMARY OF THE INVENTION

The present invention is directed to an optically-readable disk having protection against unauthorized reproduction of the data recorded on the disk.

When a user inserts a disk into a disk player for viewing of the data, the disk player spins the disk at a speed sufficient to enable the disk player to read the data so the user can view the content recorded on the disk. A typical commercially-available disk player intended solely for the purpose of viewing disk content, for example, a DVD player that is connected to a television, reads the disk at the slowest speed possible for playback and viewing.

Other disk players that are widely available, for example, those available as a component of a home computer system, routinely spin the disk at speeds much higher than what is required for the disk player to simply read the disk content for playback. These high speed disk players allow users, in conjunction with disk recording hardware, to copy the disk content in a much shorter time period than what would be required if the user were to attempt to copy the disk while the disk was spinning at the slower playback speed.

Accordingly, if a user wished to make a copy of a disk, the user would naturally use a readily available and inexpensive disk reader that would spin the disk at a higher rate of speed than the slower playback speed. This allows the user to copy the disk content in a much shorter time period. It also provides a user easy means to pirate copyrighted material by making multiple copies of the disk for illegal distribution. For example, it would take a copier two hours to copy a two hour movie recorded on a DVD where the disk was spinning at normal playback speed. However, a user could copy the same two hours worth of content in less than 10 minutes if the disk reader spun the disk at higher speeds.

The present invention is designed to frustrate a user's ability to copy the content of the disk by only allowing the disk to be read at the slower playback speed. If the disk is read at the faster "copying" speed, the disk is rendered unreadable and copying is thwarted.

In an embodiment of the invention, an optically-readable disk contains a small capsule or container attached to or embedded in its reading surface. The capsule or container is designed and attached to the disk so as not to interfere with a disk reader's reading of the disk and so as not to interfere with the stable spinning of the disk while being played. The capsule contains an obscuring compound such as ink or other opaque or reflective fluid. The capsule's membrane is constructed of a material that remains stable at low "read-only" or "playback" speeds. However, if the disk is inserted into a disk player and the disk is spun at speeds higher than the minimum speed necessary to read the disk and playback the disk content, the material of the capsule will disintegrate or otherwise destabilize. As a result, the capsule will fail and release its contents onto the reading surface of the disk, obscuring the reading surface and rendering the disk unreadable by the disk reader.

In another embodiment of the invention, a deformable membrane is attached to the reading surface of the disk in such a manner to permit reading of the disk at slow, playback speeds. When the disk is spun at speeds higher than the playback speeds, the membrane deforms. This prevents the disk content from being read by the disk reader.

In another embodiment of the invention, a deformable membrane is attached to either surface of the disk so as to permit reading of the disk at slow, playback speeds. However, when the disk is spun at speeds higher than the playback speeds, the membrane expands either above the surface of the disk or beyond the edges of the disk so as to physically interfere with the disk player's components, thus rendering the disk unplayable by the disk player.

In another embodiment of the invention, a thin membrane is adhered to the reading surface of the disk using an adhesive such that, when the disk spins in the disk reader at slow, playback-only speeds, the membrane remains uniformly adhered to the reading surface of the disk and does not interfere with reading data on the disk. However, if the disk player spins the disk at speeds higher than slow, playback-only speeds, the resulting forces may cause the adhesive to fail or introduce discontinuities in the membrane surface which causes the membrane to reflect or obscure the reading surface of the disk in a manner which renders the disk unreadable.

A more complete understanding of the method and system for preventing the copying of an optically-readable disk will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is particularly applicable to the prevention of the copying of optical disks, for example, CD, CD-ROM, DVD, DVD-ROM, HD-DVD, or Blu-Ray™ disks. Specifically, optical disks are primarily purchased (or rented) by users for playback of content encoded on the disk to produce audio-visual output on a user's television using a DVD, HD-DVD or Blu-Ray™ player, to produce music output on the user's music player, to play a game using the user's game player, and so forth. When used for this purpose, the receiving end-user player will spin the optical disk only at the slow, playback speed. If a user wishes to make an illegal copy of optical disk content, the user would insert the optical disk into a disk player that would spin the disk at speeds much faster than playback speeds used for simple viewing of the encoded disk content. In the detailed description that follows, like element numerals are used to indicate like elements appearing in one or more of the figures.

Figure 1A:
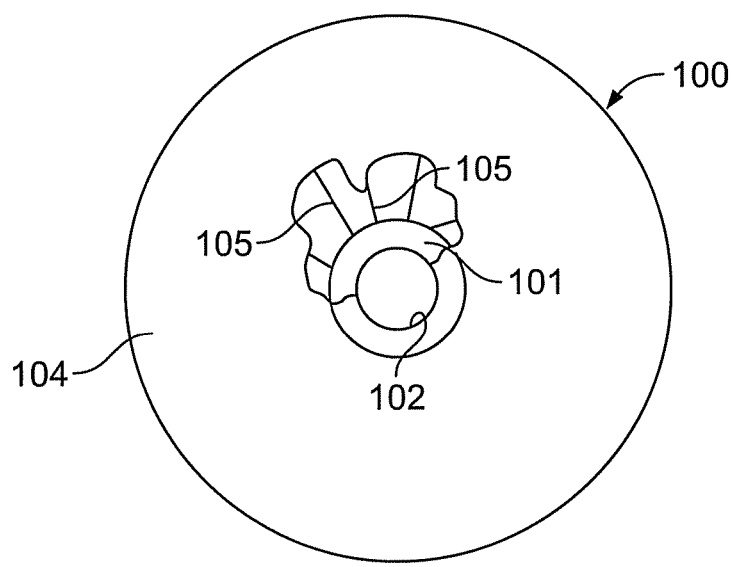
FIG. 1A is a breakaway plan view showing a planar structure of an optically-readable disk 100, according to a first preferred embodiment of the invention showing the fluid containing container 101, attached to the disk surrounding the drive rotation hole, 102, of the disk.

FIG. 1A illustrates a first preferred embodiment of the invention. Specifically, it shows a planar structure of an optically-readable disk 100 with a toroid shaped container 101, attached to the center of the disk surrounding the drive rotation hole 102 of the disk. This embodiment permits a disk player to spin the disk without any interference from the container. This embodiment also permits the disk player to read the data reading area 104, without interference from the container. The data reading area 104 may include encoded digital data designed to be read by an optical pick-up device and decoded by a player to produce audio-visual, audio, or visual output for human consumption or to provide software for operation by a computer.

As used herein, a "readable" disk or area is one that may have its microscopic encoded digital data read by an optical pick-up device for use in an electronic player or computer. It should be apparent that optical disks may also include printed surfaces and labels designed to be read by the human eye; as used herein, a readable surface does not include these types of printed surfaces and labels.

Figure 1B:
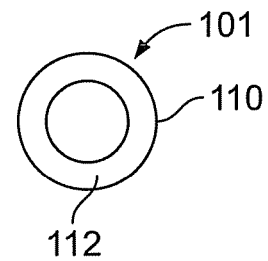
FIG. 1B is a planar view of the fluid containing container configured in a toroid shape to accommodate attachment of the container on the disk according to the first preferred embodiment of the invention.
Figure 2:
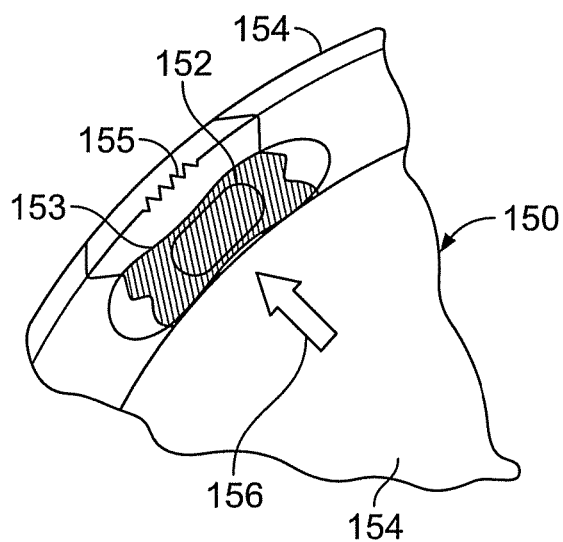
FIG. 2 is a breakaway plan view showing an alternative embodiment having a fluid-containing container located near the rim of an optically-readable disk.

When the container is subjected to angular velocities substantially greater than an angular velocity corresponding to a playback speed of the optical disk, the container may rupture, leak, or allow its contents to diffuse into an interior of the disk. The placement of the container 100 in this embodiment may allows for the container to be subject to such angular velocities upon the spinning of the disk substantially faster—for example, at least 50% or 100% faster—than needed for playing the disk in a CD player, DVD player, or the like. Also, in this embodiment, the placement of the container provides an effective means for the release and disbursement of the fluid 112 (as shown in FIG. 2) onto the data reading area upon the container membrane's 110 collapse (as shown in FIG. 1B). This disbursement of the fluid onto the data reading area thus interferes with the disk player's reading of the data recorded on the disk and therefore prevents copying of the data recorded on the disc.

Optionally, released fluid may be distributed into an interior of the disk via one or more transparent channels 105. Released fluid may comprise a gas or liquid. The released fluid may itself be opaque or reflective, or may cause a latent material distributed over a surface of the disk to become opaque or reflective. In the alternative, or in addition, the fluid may comprise a reactive material that reacts with materials in the disk's optically-readable layer to destroy or degrade readability of the disk, or the structural integrity of the disk. Preferably, the released liquid remains contained inside the disk after it is released from its container, or is of a nature so as to not harm adjacent people, devices, clothing, or the like, if released from the disk. Fluid-containing structures in an interior of a disk may be structured so that fluid of a certain viscosity will not flow into an area where data will be rendered unreadable unless the disk is spun for a prolonged period of time that is much longer than normal playing time, is spun at velocities exceeding normal playback velocity, or come combination of the foregoing. In addition, fluid-containing structures may be configured so that fluid will out of data areas to an origination region if the disk is handled in a certain fashion. For example, fluid may flow out of data areas if the disk is stored on edge for a prolonged period of time. Such a configuration may permit functioning of a disk to be restored after data is temporarily obscured.

FIG. 2 shows an alternative embodiment comprising a fluid 152 contained in a container 153 near an outer rim 157 of an optically-readable disk 150. Container 153 may be disposed adjacent a puncturing structure 155, which may comprise, for example, one or more small teeth or needles configured to puncture the container walls. When disk 150 is spun at normal playing speed, the centrifugal force acts on the container 153 in the direct indicated by arrow 156. However, the container and surrounding structures are configured such that the centrifugal force does not puncture or otherwise unseal the container. At substantially higher speeds, however, the container may be pressed against cutting teeth 155 or similar structure, releasing the fluid 152 into an interior of the disk, e.g., via a channel or partially open layer.

Figure 3:
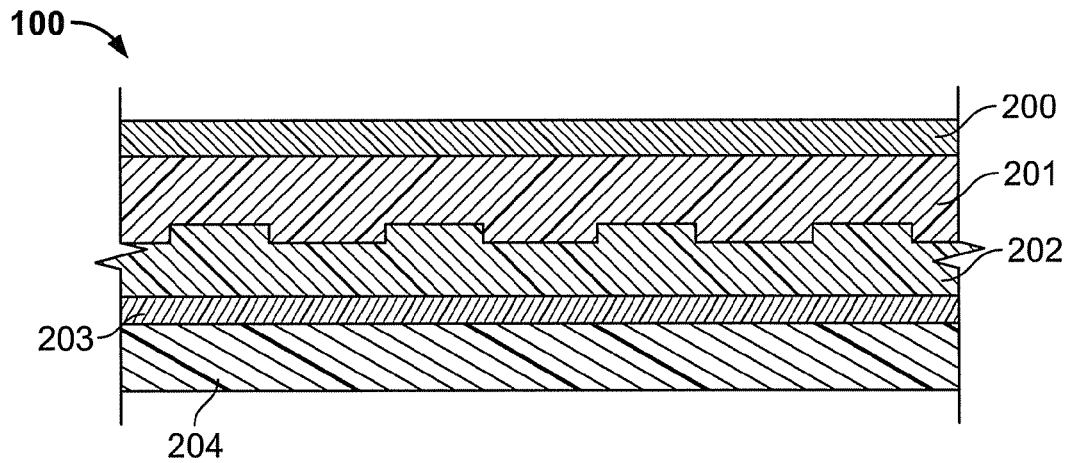
FIG. 3 is a sectional structure view of the optically-readable disk showing the plurality of layers of the disk, including a deformation layer according to an embodiment of the invention.

FIG. 3 shows a sectional structure of the disk in an alternative embodiment of the invention. Specifically, an optically-readable disc 100 may be generally constructed of a plurality of layers, including a top layer 200, which comprises the top of the disk, an optically-readable layer 201 upon which the data is recorded, as well as a reflective layer 202 and a transparent layer 204 both of which facilitate a disk player's reading of the data recorded on the optically-readable layer of the disk.

A deformation layer 203 may be interposed between the reflective layer and transparent layer. This deformation layer may be constructed of a material that is stables and permits a disk reader to read the data recorded on the optically-readable layer 201 when the disk is repeatedly spun at an angular velocity no greater than for normal playback in a consumer viewing device. When the disk is spun at an angular velocity substantially greater than the angular velocity required to read the data for playback in an end-user device, the deformation layer 203 may cavitate, crack, craze, deform, or otherwise alter its light-transmitting or reflecting properties, thereby disrupting or interfering with the disk reader's ability to read the data recorded on the disk. Based on this second preferred environment, the deformation layer can accomplish this disruption or interference by partially or entirely obscuring the optically-readable layer, which optically-readable layer is positioned behind the deformation layer. In addition, disruption of the reading of the disk can be accomplished by having the deformation layer deform or stretch beyond the edges of the disk thus causing physical interference with the disk reader.

Another embodiment has the deformation layer secured to either the bottom of the transparent layer 204 or top layer 200. In this embodiment, the deformation layer is configured so that when it deforms, it can expand beyond the physical boundaries of the disk. Again, the purpose of such deformation is to physically interfere with the disk reader and thus prevent the reading of the disk.

In an embodiment of the invention, the deformation layer may comprise an elastic material or a visco-elastic material with a shape memory. After deforming during excessively high-speed rotation, the layer may return to its original configuration after the disk stops spinning, such as by lying the disk on a flat surface. Restoration of the original shape may occur relatively quickly, for example, in less than one minute or less than one hour, or relatively slowly, for example, longer than one hour or longer than one day. In addition, or in the alternative, it may be possible to restore the deformation layer by exposure to a certain environment, for example, to an elevated temperature, infrared or ultraviolet radiation, or by exposure to a specific liquid or gas. This may permit the functioning of disks to be restored after a copy-protection feature is activated.

Figure 4:
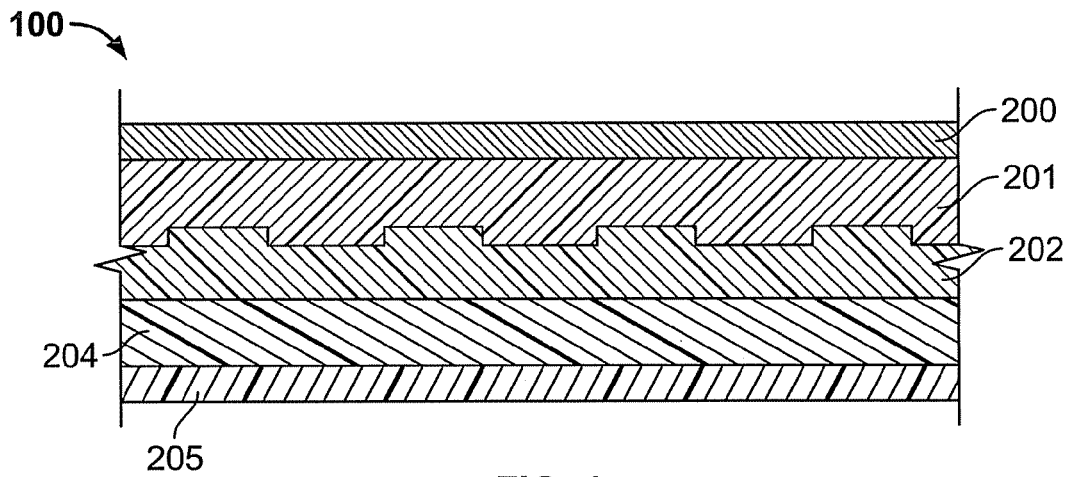
FIG. 4 is a sectional structure of an optically-readable disk according to a embodiment of the invention showing a membrane layer adhered to the disc.

FIG. 4 shows another alternative embodiment of the invention wherein a membrane layer 205 may be adhered to the transparent layer 204. The membrane layer may include an adhesive that is configured to bond the membrane layer to the transparent layer at slow, disk reading speeds. When the disk is spun at angular velocities substantially greater than the disk reading speed, the adhesive fails causing the membrane layer to separate from the transparent layer. Such separation may obscure the optically-readable layer 201 or will otherwise interfere with the disc reader's ability to read the data recorded on the optically-readable layer.

Whether a container with fluid or a deformation layer is used, the selectively-obscuring element should be more sensitive to centrifugal forces and less so to forces acting in other directions, for example, such as may arise from flexing the disk during handling or accidentally dropping the disk. A material, container, or device may be used that is not activated by impulses or forces acting for a relatively shorter periods of time. For example, in an embodiment of the invention, the disk may include an electronic, micro-mechanical, or fluidic device that integrates excess centrifugal force over time. Centrifugal force below a defined threshold and non-centrifugal forces may be ignored by the device, but centrifugal forces above a defined threshold are integrated over time until a triggering threshold is reached. For example, a micro-fluidic device may be configured such that centrifugal force above a defined threshold causes a fluid to flow through an orifice into a container. Surface tension of the fluid prevents flow when centrifugal force is below the threshold level. When the container is full, the device triggers activation of the obscuring device. Electrical or mechanical analogs of fluidic force-integrating devices may also be used.

The use of a force-integrating activation device may also be used to configure a disk so that it is rendered unreadable if spun even at relatively low velocities, i.e., normal playback speeds, for more than a defined period of time. For example, a disk could be designed to remain readable for a single play, or for any number of plays, after which it is rendered unreadable. However, because a force-time integral is used as the triggering factor, the disk may remain readable for any desired length of time under the control of the disk consumer, if it is not spun at all or is not spun for longer than the defined time.

Figure 5:
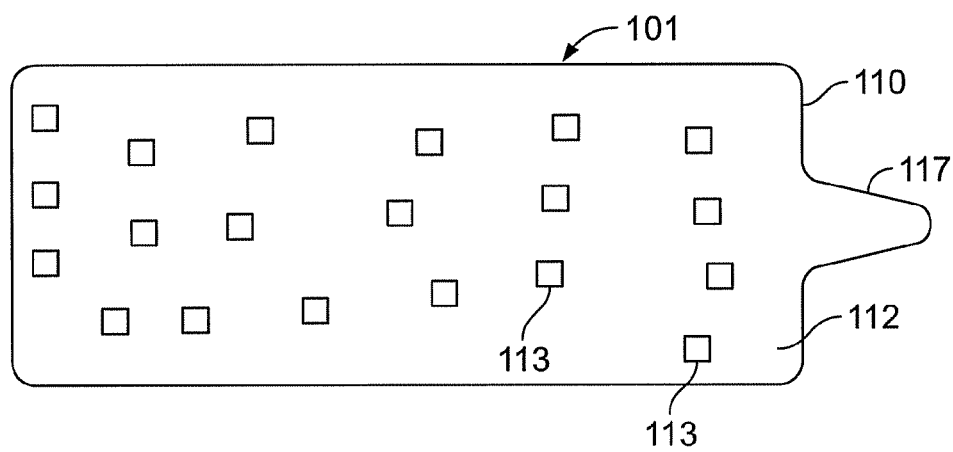
FIG. 5 is an enlarged view of a container showing the suspension of microspheres within the fluid contained in the container, configured to penetrate the container membrane when the container is subjected to sufficient centrifugal force.

FIG. 5 shows any exemplary structure of a container and contained fluid such as may be used in the embodiments exemplified by FIGS. 1A and 2, and that may be configured to integrate centrifugal force. Specifically, the container 100 may contain a fluid 102, such as an ink or solvent, configured for obscuring or otherwise rendering unreadable the reading surface of the disk upon its release from the container. Microspheres 103 may be suspended in the contained fluid, configured to degrade the membrane 101 of the container when they come in contact with the membrane. Under sufficient and sustained centrifugal force, sufficient numbers of microspheres should come into contact with the membrane, causing the membrane to rupture, leak or otherwise release the fluid onto the disk. Container 100 may be configured with one or more depressions or pockets 117 in the radial direction that gradually collect microspheres when the container is subjected to centrifugal force above a defined threshold. Below the threshold, the viscosity of fluid 102 may prevent migration of microspheres to the membrane walls. After a sufficient number of microspheres have collected near a membrane wall, the membrane may rupture, releasing fluid 102.

Figure 6:
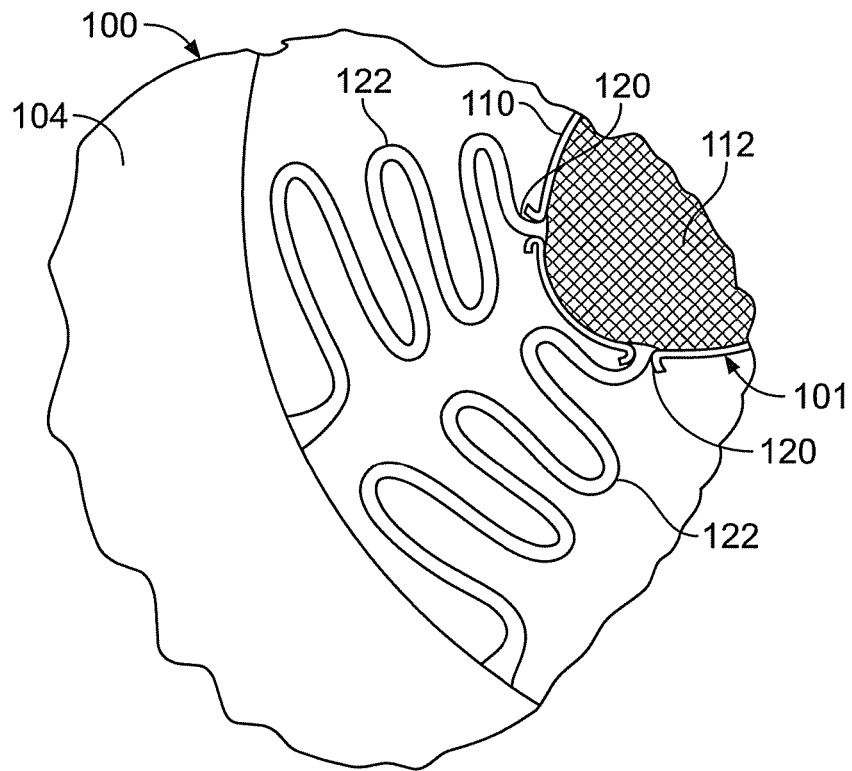
FIG. 6 shows an exemplary fluid container including a structure for fluidic integration of centrifugal force over time.

FIG. 6 shows a portion of an exemplary container 101 incorporating a fluidic structure configured to integrate centrifugal force over time. Container 101 may be located near or in the hub of an optically-readable disk 100, and may be generally toroid in shape. The fluidic structure may comprise one or more nozzles 120 or openings in the membrane wall 110. Fluid 112 and openings 120 may be configured such that, due to the surface tension and viscosity of fluid 112 and the configuration of each opening 120, the fluid will not pass out of the container thorough the opening unless the disk 100 is spinning at an angular velocity substantially greater than the normal playback velocity.

The fluidic structure may further comprise a channel 122 through which fluid 112 must pass before it reaches and corrupts the encoded-data portion 104 of disk 100. The channel may be provided between disk layers and be generally closed along its length and open at both ends. Any number of channels may be provided to allow for fluid communication between each opening and the encoded area 104. The channel may have any suitable cross-section, interior surface properties and length so as to slow droplets or steams of fluid passing through the opening and prevent fluid from reaching the encoded data until the disk 100 has been spun for a defined integral of angular velocity and time. For example, the channel may be designed so that fluid exiting the nozzles 120 does not reach the data area 104 until the disk has been spun for a period of time greater than, for example, one second, ten seconds, one minute, ten minutes, one hour, ten hours, or one-hundred hours at a normal playback velocity, and for correspondingly less time at greater velocities. Channel 122 may be provided in a linear, serpentine, labyrinth, coil, or any other desired course. It should be apparent that purely velocity-sensitive triggering devices and time-velocity sensitive devices may be combined in a single device.

In an embodiment of the invention, channel 122 and a fluid-containing portion of data area 104 may be configured so that fluid can flow back through the channel and into container 101 after it has been released. For example, the disk may include a funnel-shaped transition channel connecting a distal end of channel 122 to the data area 104. Fluid released into the data area may then be funneled back into the channel by setting the disk on edge, so that gravity acts to pull released fluid back into the channel and container. This may permit functioning of the disk to be restored after a release event. In this embodiment, nozzle 120 may permit bidirectional flow of fluid, i.e., in or out of container 101. In the alternative, nozzle 120 may be omitted.

Figure 7:
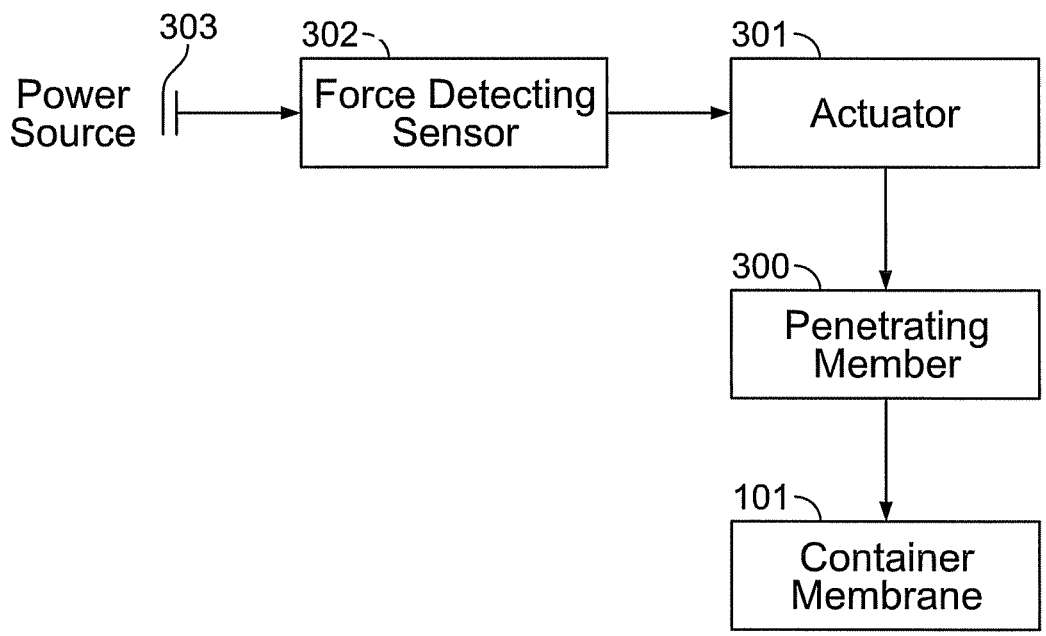
FIG. 7 is a block diagram showing a configuration for a circuit activated penetrating member attached to the container membrane and configured to pierce the container membrane upon the detection of sufficient, sustained centrifugal forces.

FIG. 7 provides an illustration, in the form of a block diagram, of an additional disk or method for causing the rupture of a fluid container or other activation of a data-corrupting system. Specifically, a circuit-activated penetrating member system comprising a power source 303, a force detecting sensor 302, an actuator 301 and penetrating member 300 may attached to the membrane 110 of a container 101. These elements may be incorporated into a very small electronic device and secured to the disk, for example, by an adhesive label or by holding into the disk hub. The penetrating member 300 may be positioned adjacent to the membrane 110 so as to rupture the membrane when activated. The force detecting sensor 302 may measure any centrifugal force applied to the system as a result of the spinning of the disk, to which the system, through the container, is attached. The sensor 302 may also be configured to measure the sustained duration of any such centrifugal force. When the sensor 302 detects a sufficient centrifugal force of sufficient duration, it signals the actuator 301 which activates the penetrating member 300 which ruptures the membrane.

According to the foregoing, therefore, an optical disk may be configured with one of the foregoing containers, layers, membranes, or devices configured to render encoded data on the disk unreadable if the disk is spun at an angular velocity substantially greater than a playback angular velocity used for normal reading of the encoded data by an end user device, for example, by a CD player, an DVD player, a HD-DVD player, or a Blu-Ray™ player, to produce an audio-visual output. In an embodiment of the invention, the container, layer, membrane or device is configured to render the disk unreadable if the disk angular velocity exceeds the playback angular velocity by at least 50%. In other embodiments, the container, layer, membrane or device may be configured to render the disk unreadable if the disk angular velocity exceeds the playback angular velocity by one of at least 100%, 500%, 1000%, 1500%, 2000%, or 2500%. In the alternative, or in addition, the container, layer, membrane or device may be configured to render the disk unreadable if the disk angular velocity exceeds the playback angular velocity by at least any of the foregoing thresholds or by any amount for a period of time, or by an integral of angular velocity and time. In the alternative, the container, layer, membrane or device may be configured to render the disk unreadable if the disk angular velocity does not exceed the playback angular velocity, but if the integral of angular velocity and time exceeds a defined threshold, to provide a disk that that cannot be spun and remain readable for more than a limited amount of playing time.

Having thus described an embodiment of an optically-readable disk designed to inhibit the copying of the content recorded on it by rendering the disk unreadable at a speed substantially higher than the disk's standard playback speed, it should be apparent to those skilled in the art that certain advantages of the within system have been achieved. It should also be appreciated that various modifications, adaptations, and alternative embodiments thereof may be made within the scope and spirit of the present invention. The invention is defined by the following claims.

What is claimed is:

1. An optically-readable disk comprising:
   a plurality of layers, including an optically-readable layer having data encoded therein;
   a container coupled to a disk layer, the container configured to contain a fluid when the disk is spun at a first angular velocity suitable for reading the encoded data, and to release the fluid when the disk is spun at a second angular velocity substantially higher than the first angular velocity; and
   an integrating device coupled between the container and a data area of the disk, the integrating device configured to cause release of fluid to the data area after an integral of centrifugal force and time exceeds a threshold to reversibly obscure readability of the data area, the integrating device configured to permit flow of released fluid from the data area back into the container to restore the readability of the data area after a defined time period.

2. The optically-readable disk of claim 1, further comprising a fluid contained in the container, the fluid selected from the group consisting of: a liquid, an ink, a solvent, a solution, a mixture, a suspension, an emulsion or a gas.

3. The optically-readable disk of claim 1, wherein the container comprises a toroid capsule attached to the disk in proximity to a center hole of the disk.

4. The optically-readable disk of claim 1, wherein the container is embedded between the layers of the optically-readable disk.

5. The optically-readable disk of claim 1 further comprising a plurality of microspheres positioned within the container and suspended within the fluid in the container.

6. The optically-readable disk of claim 1, further comprising at least one circuit-activated penetrating member operatively coupled to the membrane of the container.

* * * * *